US009915036B2

(12) United States Patent
Penland, Jr.

(10) Patent No.: US 9,915,036 B2
(45) Date of Patent: *Mar. 13, 2018

(54) STACKABLE MAT CONSTRUCTION

(71) Applicant: QUALITY MAT COMPANY, Beaumont, TX (US)

(72) Inventor: Joe Penland, Jr., Beaumont, TX (US)

(73) Assignee: Quality Mat Company, Beaumont, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/155,757

(22) Filed: May 16, 2016

(65) Prior Publication Data
US 2016/0258116 A1    Sep. 8, 2016

Related U.S. Application Data

(63) Continuation-in-part of application No. 15/081,340, filed on Mar. 25, 2016, now Pat. No. 9,476,164,
(Continued)

(51) Int. Cl.
*E01C 9/08* (2006.01)
*E01C 11/16* (2006.01)
(Continued)

(52) U.S. Cl.
CPC ............. *E01C 9/086* (2013.01); *B32B 21/12* (2013.01); *B32B 27/08* (2013.01); *E01C 5/14* (2013.01);
(Continued)

(58) Field of Classification Search
CPC ... E01C 9/086; E01C 9/08; E01C 5/00; E01C 5/18; E01C 5/20; E01C 11/24
See application file for complete search history.

(56) References Cited

U.S. PATENT DOCUMENTS 2,211,513 A * 8/1940 Nagin ................ E01D 19/125
14/73
2,836,529 A    5/1958 Morris
(Continued)

FOREIGN PATENT DOCUMENTS

CA    2 233 776 A1    12/1999
CA    2 557 701 A1    2/2008
(Continued)

OTHER PUBLICATIONS

U.S. Appl. No. 14/855,336, Final Rejection, dated Jun. 16, 2016.
(Continued)

*Primary Examiner* — Abigail A Risic
(74) *Attorney, Agent, or Firm* — Winston & Strawn LLP

(57) ABSTRACT

A stackable mat includes a first industrial mat, a second industrial mat and an internal support structure. The mats each have a plurality of layers or plies of construction materials for forming the upper and lower portions, respectively, of the stacker mat, and have a thickness that provide support for vehicle movement thereover. The internal support structure includes a truss or elongated members for retaining the first and second mats in parallel spaced relation at a distance that is greater than the thickness of the first industrial mat. Preferably, the internal support structure and the second industrial mat or both the first and second industrial mats are configured with sufficient openings to allow water to flow therethrough so that the stacker mat may be placed in wet areas to form a temporary roadway or platform.

20 Claims, 10 Drawing Sheets

Related U.S. Application Data which is a continuation-in-part of application No. 15/056,212, filed on Feb. 29, 2016, now Pat. No. 9,447,547, which is a continuation-in-part of application No. 14/839,888, filed on Aug. 28, 2015, now Pat. No. 9,315,949.

(60) Provisional application No. 62/054,186, filed on Sep. 23, 2014, provisional application No. 62/138,143, filed on Mar. 25, 2015, provisional application No. 62/158,196, filed on May 7, 2015, provisional application No. 62/211,662, filed on Aug. 28, 2015, provisional application No. 62/211,664, filed on Aug. 28, 2015.

(51) Int. Cl.

| | | |
|---|---|---|
| *E01C 11/24* | (2006.01) | |
| *B32B 21/12* | (2006.01) | |
| *B32B 27/08* | (2006.01) | |
| *E01C 5/14* | (2006.01) | |
| *E01C 5/22* | (2006.01) | |
| *B32B 7/08* | (2006.01) | |
| *B32B 3/08* | (2006.01) | |
| *B32B 15/095* | (2006.01) | |
| *B32B 21/04* | (2006.01) | |
| *B32B 7/00* | (2006.01) | |
| *B32B 7/04* | (2006.01) | |
| *B32B 15/18* | (2006.01) | |
| *B32B 15/20* | (2006.01) | |
| *B32B 21/08* | (2006.01) | |
| *B32B 3/02* | (2006.01) | |
| *B32B 3/10* | (2006.01) | |
| *B32B 3/14* | (2006.01) | |
| *B32B 3/18* | (2006.01) | |
| *B32B 3/26* | (2006.01) | |

(52) U.S. Cl.
CPC ............... *E01C 5/22* (2013.01); *E01C 11/16* (2013.01); *E01C 11/24* (2013.01); *B32B 3/02* (2013.01); *B32B 3/085* (2013.01); *B32B 3/10* (2013.01); *B32B 3/14* (2013.01); *B32B 3/18* (2013.01); *B32B 3/26* (2013.01); *B32B 7/005* (2013.01); *B32B 7/045* (2013.01); *B32B 7/08* (2013.01); *B32B 15/095* (2013.01); *B32B 15/18* (2013.01); *B32B 15/20* (2013.01); *B32B 21/042* (2013.01); *B32B 21/045* (2013.01); *B32B 21/08* (2013.01); *B32B 2250/44* (2013.01); *B32B 2255/06* (2013.01); *B32B 2255/08* (2013.01); *B32B 2255/205* (2013.01); *B32B 2255/24* (2013.01); *B32B 2272/00* (2013.01); *B32B 2307/546* (2013.01); *B32B 2307/548* (2013.01); *B32B 2307/558* (2013.01); *B32B 2307/56* (2013.01); *B32B 2307/712* (2013.01); *B32B 2307/726* (2013.01); *B32B 2307/7265* (2013.01); *B32B 2307/732* (2013.01); *B32B 2471/00* (2013.01); *B32B 2607/00* (2013.01)

(56) References Cited

U.S. PATENT DOCUMENTS

| | | |
|---|---|---|
| 4,462,712 A | 7/1984 | Penland, Sr. |
| 4,629,358 A | 12/1986 | Springston et al. |
| 4,879,152 A * | 11/1989 | Green .................. B32B 3/12 156/286 |
| 4,889,444 A | 12/1989 | Pouyer |
| 4,932,178 A | 6/1990 | Mozingo |
| 5,020,937 A | 6/1991 | Pouyer |
| 5,050,366 A | 9/1991 | Gardner et al. |
| 5,163,776 A | 11/1992 | Pouyer |
| 5,273,373 A | 12/1993 | Pouyer |
| 5,342,260 A | 8/1994 | Markland |
| 5,653,551 A | 8/1997 | Seaux |
| 5,822,944 A | 10/1998 | Penland, Sr. |
| 5,888,612 A | 3/1999 | Needham et al. |
| 6,007,271 A | 12/1999 | Cole et al. |
| 6,214,428 B1 | 4/2001 | Henderson |
| 6,231,994 B1 | 5/2001 | Totten |
| 6,380,309 B1 | 4/2002 | Parker et al. |
| 6,474,905 B1 | 11/2002 | Smith, Jr. |
| 6,497,956 B1 | 12/2002 | Phillips et al. |
| 6,511,257 B1 | 1/2003 | Seaux et al. |
| 6,649,110 B1 | 11/2003 | Seaux et al. |
| 6,662,508 B1 | 12/2003 | Else |
| 6,695,527 B2 | 2/2004 | Seaux et al. |
| 6,722,831 B2 | 4/2004 | Rogers |
| 6,746,176 B2 | 6/2004 | Smith |
| 6,821,623 B2 | 11/2004 | Kvesic |
| 7,137,226 B2 | 11/2006 | Fiutak et al. |
| 7,303,800 B2 | 12/2007 | Rogers |
| 7,404,690 B2 | 7/2008 | Lukasik et al. |
| 7,413,374 B2 | 8/2008 | Rogers et al. |
| 7,427,172 B2 | 9/2008 | Lukasik |
| D609,956 S | 2/2010 | Lukasik |
| 7,818,929 B2 | 10/2010 | Fiutak et al. |
| 7,934,885 B2 | 5/2011 | Fournier |
| 8,061,929 B2 | 11/2011 | Dagesse |
| 8,070,004 B2 | 12/2011 | Williams et al. |
| 8,088,477 B2 | 1/2012 | Curtis et al. |
| 8,382,393 B1 | 2/2013 | Phillips |
| 8,613,373 B2 | 12/2013 | Holtby et al. |
| 8,784,001 B1 | 7/2014 | Phillips |
| 8,906,480 B2 | 12/2014 | Fiutak et al. |
| 8,936,073 B1 | 1/2015 | Phillips |
| 9,133,598 B2 | 9/2015 | Hsu |
| 2002/0110418 A1 | 8/2002 | Renick |
| 2004/0037644 A1 | 2/2004 | Renick |
| 2004/0071914 A1 | 4/2004 | Fiutak et al. |
| 2004/0253055 A1 | 12/2004 | Polivka, Jr. |
| 2005/0022363 A1 | 2/2005 | Harrison |
| 2006/0260264 A1 | 11/2006 | Reynolds |
| 2006/0265976 A1 | 11/2006 | Fiutak |
| 2007/0056228 A1 | 3/2007 | Penland et al. |
| 2007/0237581 A1 | 10/2007 | Lukasik et al. |
| 2008/0028703 A1 | 2/2008 | Brandstrom |
| 2008/0085154 A1 | 4/2008 | Lukasik |
| 2008/0152861 A1 | 6/2008 | Barker |
| 2008/0292397 A1 | 11/2008 | Farney et al. |
| 2009/0087261 A1 | 4/2009 | Fournier |
| 2009/0301004 A1 | 10/2009 | Dagesse |
| 2011/0233363 A1 | 9/2011 | Wold |
| 2011/0280657 A1 | 11/2011 | Martinez |
| 2012/0063844 A1 | 3/2012 | Wold |
| 2013/0284872 A1 | 10/2013 | Tubbs |
| 2013/0306804 A1 | 11/2013 | Holtby et al. |
| 2013/0318896 A1 | 12/2013 | Rogers |
| 2014/0154462 A1 | 6/2014 | Fiutak et al. |
| 2014/0193196 A1 | 7/2014 | Fournier |
| 2014/0199119 A1 | 7/2014 | Stasiewich |
| 2014/0205377 A1 | 7/2014 | Hill |
| 2014/0341649 A1 | 11/2014 | Bryan et al. |

FOREIGN PATENT DOCUMENTS

| | | |
|---|---|---|
| CA | 2 637 470 A1 | 1/2010 |
| EP | 2 705 950 A1 | 3/2014 |
| WO | 95/25076 A1 | 9/1995 |
| WO | 2006/002507 A1 | 1/2006 |
| WO | 2006/048654 A1 | 5/2006 |

OTHER PUBLICATIONS

U.S. Appl. No. 14/855,336, Notice of Allowance, dated Sep. 16, 2016.

(56) References Cited

OTHER PUBLICATIONS

Forest Products Laboratory. Wood Handbook—Wood as an Engineering Material—4. Mechanical Properties of Wood. U.S. Department of Agriculture. Online version available at: app.knovel.com/hotlink/pdf/id:kt0052LP04/wood-handbook-wood-animechanical-properties (1999).
"Inflammable". Wiktionary. Archived Sep. 6, 2014.
Richard West Co., Inc., Steel Reinforced Crane Mat, downloaded from the internet on May 11, 2016 (see http://www.richardwestcompany.com/products.html).
U.S. Appl. No. 14/839,888, Non-Final Rejection, dated Nov. 6, 2015.
U.S. Appl. No. 14/839,888, Notice of Allowance, dated Jan. 14, 2016.
U.S. Appl. No. 14/839,888, Notice of Allowability, dated Feb. 19, 2016.
U.S. Appl. No. 14/839,900, Non-Final Rejection, dated Oct. 29, 2015.
U.S. Appl. No. 14/839,900, Notice of Allowance, dated Jan. 20, 2016.
U.S. Appl. No. 14/855,336, Non-Final Rejection, dated Feb. 9, 2016.
International Search Report and Written Opinion, PCT/US2017/031160, dated Jul. 17, 2017.
International Search Report and Written Opinion, PCT/US2017/014658, dated Jul. 10, 2017.

* cited by examiner

STACKABLE MAT CONSTRUCTION

CROSS-REFERENCE TO RELATED APPLICATIONS

This application is a continuation-in-part of U.S. application Ser. No. 15/081,340 filed Mar. 25, 2016, which is a continuation-in-part of U.S. application Ser. No. 15/056,212 filed Feb. 29, 2016, which in turn is a continuation-in-part of U.S. application Ser. No. 14/839,888 filed Aug. 28, 2015, now U.S. Pat. No. 9,315,949, which claims the benefit of U.S. provisional application Nos. 62/054,186 filed Sep. 23, 2014, 62/138,143 filed Mar. 25, 2015 and 61/158,196 filed May 7, 2015. This application also claims the benefit of U.S. provisional patent applications Nos. 62/211,662 filed Aug. 28, 2015 and 62/211,664 filed Aug. 28, 2015. The entire content of each foregoing application is expressly incorporated herein by reference thereto.

FIELD OF THE INVENTION

The present invention relates generally to a reusable system for the construction of roadways and equipment support surfaces in areas having poor ground integrity and natural or artificial barriers. More particularly, the present invention relates to a system of durable mats which can be stacked to form roadways and/or equipment support surfaces above a water line, such as a river, creek, pond, or the like. More particularly still, the present invention relates to a reusable system of stackable mats which can be quickly and easily positioned in a water-covered area in a plurality of stacked layers to form roadways and/or equipment support surfaces, and which can thereafter be easily removed and stored until needed again.

BACKGROUND OF THE INVENTION

Conventional mats used when crossing a deep wet area need to be piled up as many 8 or 12 inch thick crane mats to fill the void below the wet area or water until the mats get to a desired height, above the water or wet area. Next, a final layer disposed above the water needs to be added to create a work platform or roadway.

Conventional mats also have problems with the mats moving due to tidal surge or rising waters, for example. Also, when it is time to remove these mats there may be challenges, such as, the mats may be hard to retrieve from the bottom being submerged in water. A user may need to "fish" for the mats with heavy tools or equipment, such as a track hoe excavator which may damage the soil on the bottom. Further, given these difficulties, the mats may end up being left and never retrieved which may not be desirable in environmentally sensitive areas.

Accordingly, it is desirable to provide a stackable mat that is stable in deep water by allowing for water flow-through, can easily be retrieved from water areas and requires fewer stacked mats, thus creating faster assembly, and is heavy enough to stay in position when placed.

SUMMARY OF THE INVENTION

The foregoing needs are met, to a great extent, by the present invention, wherein in one aspect an apparatus is provided that in some embodiments it is desirable to provide a stackable mat that is stable in deep water by allowing for water flow-through, can easily be retrieved from water areas and requires fewer stacked mats, thus creating faster assembly, and is heavy enough to stay in position when placed.

In accordance with one embodiment of the present invention, a stackable or stacker mat comprising a first industrial mat having a plurality of layers or plies of construction materials for forming the upper portion of the stacker mat, the first industrial mat made of materials and having a thickness that provide support for vehicle movement thereover; a second industrial mat having a plurality of layers or plies of construction materials for forming the lower portion of the stacker mat, the second industrial mat also made of materials and having a thickness that provide support for vehicle movement thereover; and an internal support structure that includes truss or elongated members for retaining the first and second mats in parallel spaced relation at a distance that is greater than the thickness of the first industrial mat. Advantageously the internal support structure configured with sufficient openings to allow water to flow therethrough so that the stacker mat may be placed in wet areas to form a temporary roadway or platform.

The first industrial mat, the second industrial mat or both of the first and second industrial mats comprises one or more layers of wood, engineered wood, a thermoplastic, a reinforced thermosetting plastic, an elastomer, solid, hollow or filled tubular components, encapsulated material, a composite material, recycle materials or combinations thereof, any or all of which are optionally configured or treated to have water and environmental resistance if necessary.

Preferably, the first industrial mat and the second industrial mat comprises two or three layers or plies for each industrial mat. When the first industrial mat and the second industrial mat each include two layers or plies, the layers or plies are each about three inches in thickness. When the first industrial mat and the second industrial mat each include three layers or plies, wherein the layers or plies are each about two inches in thickness. Each of these mats has a modulus of elasticity of at least about 1.6 Mpsi, and a load bearing capacity that is configured to withstand a load of at least about 500 to about 1000 psi without permanent deformation of the mat.

The elongated members of the internal support structure may include beams, columns, structures or layers of wood, engineered wood, thermoplastics, thermosetting plastics, elastomers, recycled plastic materials, steel, aluminum, stainless steel, copper or other metals, weighted composite material or any combination thereof. These can be used as integral components or in the form of layers or components that are joined together to form the desired thickness for spacing the first and second mats from each other.

The truss members preferably comprise steel, stainless steel, aluminum, copper, galvanized steel or a combination thereof. Preferably, the truss members are connected by cross-members for additional strength in holding the first and second industrial mats in their parallel spaced relation. The stacker mat may further comprise a peripheral frame that surrounds the truss members and is connected to the first and second industrial mats near their peripheries. Preferably, the frame comprises plates having sufficient openings to allow water to flow between the first and second industrial mats.

The internal support structure is connected to the first industrial mat and the second industrial mat via bolts, screws or rivets. Also, the first industrial mat and the second industrial mat are configured to include an overall thickness of about 6 to about 8 inches, a longitudinal dimension of about 6 to about 40 feet, and a transverse dimension of about 6 to about 10 feet. The spacer members maintain the first and second mats in parallel spaced relation at a distance of about 1 to about 3 feet. And like the mat materials, the truss or elongated members have a modulus of elasticity of at least about 1.6 Mpsi, and wherein the truss or elongated members have a load bearing capacity that is configured to withstand a load of at least about 500 to about 1000 psi without permanent deformation of the truss or elongated members.

Advantageously, the stacker mat further comprises lifting elements including D-shaped rings, O-shaped rings, chains or cables that are connected directly to the stacker mat to allow overhead lifting of the stacker mat, wherein the lifting elements are optionally coated, painted or treated to provide additional water and environmental resistance.

Another embodiment of the invention relates to a stacker mat comprising an internal support structure in the form of truss or elongated members having longitudinal and transverse sides, with the internal support structure configured to support or allow attachment of a first industrial mat having a plurality of layers or plies of construction materials configured to form the upper portion of the mat and attached to a longitudinal side the support structure and a second industrial mat having a plurality of layers or plies of construction materials configured to form the lower portion of the mat and attached to an opposite longitudinal side of the support structure, wherein the first industrial mat made of materials and having a thickness configured to provide support for vehicle movement thereover, wherein the second industrial mat made of materials and having a thickness configured to provide support for vehicle movement thereover, and wherein the second industrial mat or of both the first and second industrial mats with the internal support structure are configured with sufficient openings to allow water to flow therethrough so that the mat may be placed in wet areas to form a temporary roadway or platform.

For all embodiments, it is preferred to have the internal support structure made of environmentally resistant materials or otherwise treated or configured to avoid deterioration of the internal support structure when repeatedly exposed to water. For example, the truss or elongated members can be made of metal or plastic materials or by treated, coated or painted wood. Also, the metal components can be painted or coated if desired, e.g. painting or galvanizing a steel plate to prevent rust from appearing.

There has thus been outlined, rather generally, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Preferred features of the invention are more fully appreciated upon a review of the appended drawing figures, wherein.

DETAILED DESCRIPTION OF THE INVENTION

Figure 1:
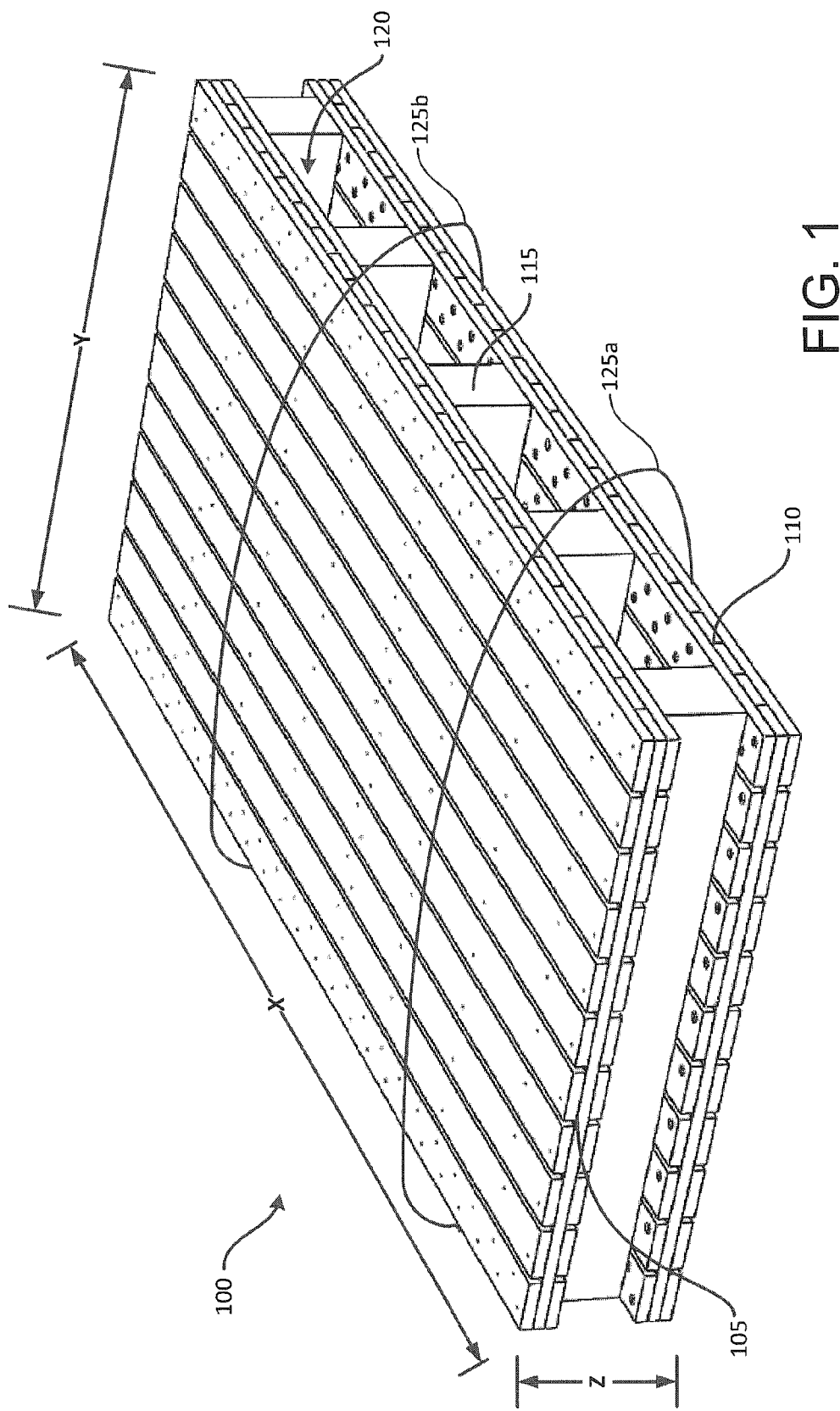
FIG. 1 is a perspective view illustrating a stackable mat assembly according to certain embodiments of the disclosure.

The invention will now be described with reference to the drawing figures, in which like reference numerals refer to like parts throughout. An embodiment in accordance with the present invention provides a stackable mat platform, support, or roadway used as filler in deep water or swampy areas lacking the same. The present invention may be configured to gain height by reducing weight and allowing water to flow in between each mat platform configuration. Further, the present invention may be configured to be more readily utilized and retrieved from the deep water or swampy areas thereby saving time and money for a user.

Generally, the invention will utilize two mats that are spaced apart by various support structures that act as internal spacers. The two mats can be any of those disclosed in U.S. application Ser. Nos. 15/056,212 and 15/056,344 each filed Feb. 29, 2016, the entire contents of which are expressly incorporated herein by reference thereto. Preferably, these mats will be between about 2 to about 8 inches thick in one to four plies that are each between 2 and 4 inches thick. The width and length of the mats can vary but are preferably between about 6 to about 10 feet wide and about 6 to about 40 feet long. Often these mats are each about 6 inches thick and 8 feet wide by about 12, about 14 or about 16 feet long.

Certain terms that are used herein are defined hereinbelow to assist in the understanding of the invention.

The term "industrial mat" is intended to cover relatively large mats having widths of at least about 4 feet with lengths running from about 4 feet to 40 feet and incorporating elongated members, beams, or other components having square or rectangular cross sections of sizes of at least about 6×6 to 24×24 inches with lengths from about 4 feet to as much as 40 feet or more. Preferred dimensions are described throughout the specification. As noted, previous and current mats of this type that are commercially available are primarily constructed of monolithic wood.

The term "non-wood" to describe the support structure is used for its ordinary meaning. The components of the structure are generally not made of wood but instead are made of meat, a thermosetting plastic or other materials that are resistant to degradation due to environmental factors such as moisture from water, snow or ice, organisms that can cause wood rot, or similar external factors that affect wood.

The term "substantially" is used for its ordinary meaning to indicate that the dimensions are not precise or exact. A skilled artisan can readily determine what tolerances are acceptable to provide a surface that is considered to be flat based upon the size of the side beams and the type of service that the mat is expected to provide. There is no requirement that the beams and elongated members be flush with each other along the top and bottom surfaces of the mat. Typically, the term "substantially" will mean that the top surfaces of the beams and elongated members can vary by as much as a few inches although in the more preferred embodiments the variance is less than 1 inch.

Additionally, all dimensions recited herein are approximate and can vary by as much as +10% to in some case +25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

The term "environmentally resistant material" means a material that is not subject to deterioration by water, moisture or other environmental conditions when compared to a conventional wood material such as white oak that is commonly used for such mats. This term includes thermoplastic and thermosetting materials along with elastomers and even metals such as steel, aluminum or stainless steel. While steel does rust when encountering moisture or water, this is not considered to be a deterioration of the material as it is a surface phenomenon that does not affect the physical properties of the material but instead just detracts from its surface appearance. To avoid this, the steel components can be coated or painted to provide a better appearance and even further environmental resistance. Under certain conditions treated wood can withstand rotting and degradation much better than untreated wood such that it would be considered to be an environmentally resistant material because of its improved resistance against rotting.

A specific embodiment of the present inventive apparatus is illustrated in FIG. 1. FIG. 1 is a perspective view illustrating a stackable mat assembly 100. In FIG. 1, mat assembly 100 may include a first industrial mat 105 forming an upper portion, a second industrial mat 110 forming a lower portion, and a plurality of internal support spacers 115. First industrial mat 105 may comprise a plurality of layers or plies of construction material. Second industrial mat 110 may comprise a plurality of layers or plies of construction material. The construction material may include metal, an elastomeric material, a thermoplastic material, a thermosetting material, or a combination thereof. For example, mat 105 may be configured as a multi-layered mat including a top layer, a middle layer, and a bottom layer with each layer about 2 inches in thickness.

In some embodiments, mat 105 includes the top layer and the bottom layer being arranged parallel to each other extending in a longitudinal direction and the middle layer extending in a transverse direction disposed there between. These layers of mat 105 may be configured to be connected together by a connector, such as bolts, nails, screws, rivets or the like. In certain embodiments, mat 110 may be similarly configured as mat 105. In addition, mat 105 and mat 110 may each be configured to have an overall thickness of about 6 inches to provide adequate support as a platform or roadway for vehicle movement thereover. In some embodiments mat 105 and mat 110 are configured with a longitudinal (length) dimension X and a transverse (width) dimension Y. For example, dimension X may be about 6 to 40 feet, preferably about 16 feet for easy transport and dimension Y may be about 6 to about 10 feet, preferably about 8 feet, in certain embodiments.

In certain embodiments, mat 105 and mat 110 may comprise wood, engineered wood, a thermoplastic, a reinforced thermosetting plastic, solid, hollow or filled tubular components, encapsulated material, a composite material, or a combination thereof, all of which may be configured to be water resistant. In some embodiments, mat 105 and/or mat 110 may include a single layer about 6 inches in thickness, two layers each about 3 inches in thickness, four layers each about 1.5 inches in thickness, or the three layers as discussed above each at about 2 inches in thickness.

The first or second mat can be made of any one or more of wood, treated wood, metal, an elastomeric material, a thermoplastic material, a thermosetting material or various combinations thereof as shown in the patent applications that are incorporated by reference herein. This would include structures or shapes such as boards, beams, plates, sheets, tubes, or skins, wherein openings or open areas of such structures or shapes filled with other materials to either increase or decrease the overall weight of the first or second mats. And as noted these structures or shapes can be made to conform to the entire overall width and length of the mat or they can be made is segments or portions that are joined together in any way to form the first and second mats. The first or second mats can also be made of recycled boards from rice hulls or used carpet fibers. These boards or sheets are typically extruded or pressed from recycled waste products that have plastic fibers that are chopped and blended together and are surprising durable as well as environmentally resistant. In some embodiments, the first or second mat would simply be a wear pad made of such materials.

The first and second mats that are attached support spacers can be made in a single or multiple layers of mat components. The single layer would be as a solid sheet. Any of the foregoing materials can be used for this although the materials with lesser strengths and stiffnesses would generally require additional support spacers. This of course would depend upon the required performance of the stacker mat. The first and second mats may also have a hollow plastic core which may be filled with other materials such foam, aggregate or other materials as disclosed in the applications that are incorporated by reference herein. The single layer can also be individual boards or sheets of plastic, metal or wood but these may require more bracing from the support spacers to handle the anticipated loads.

Figure 2:
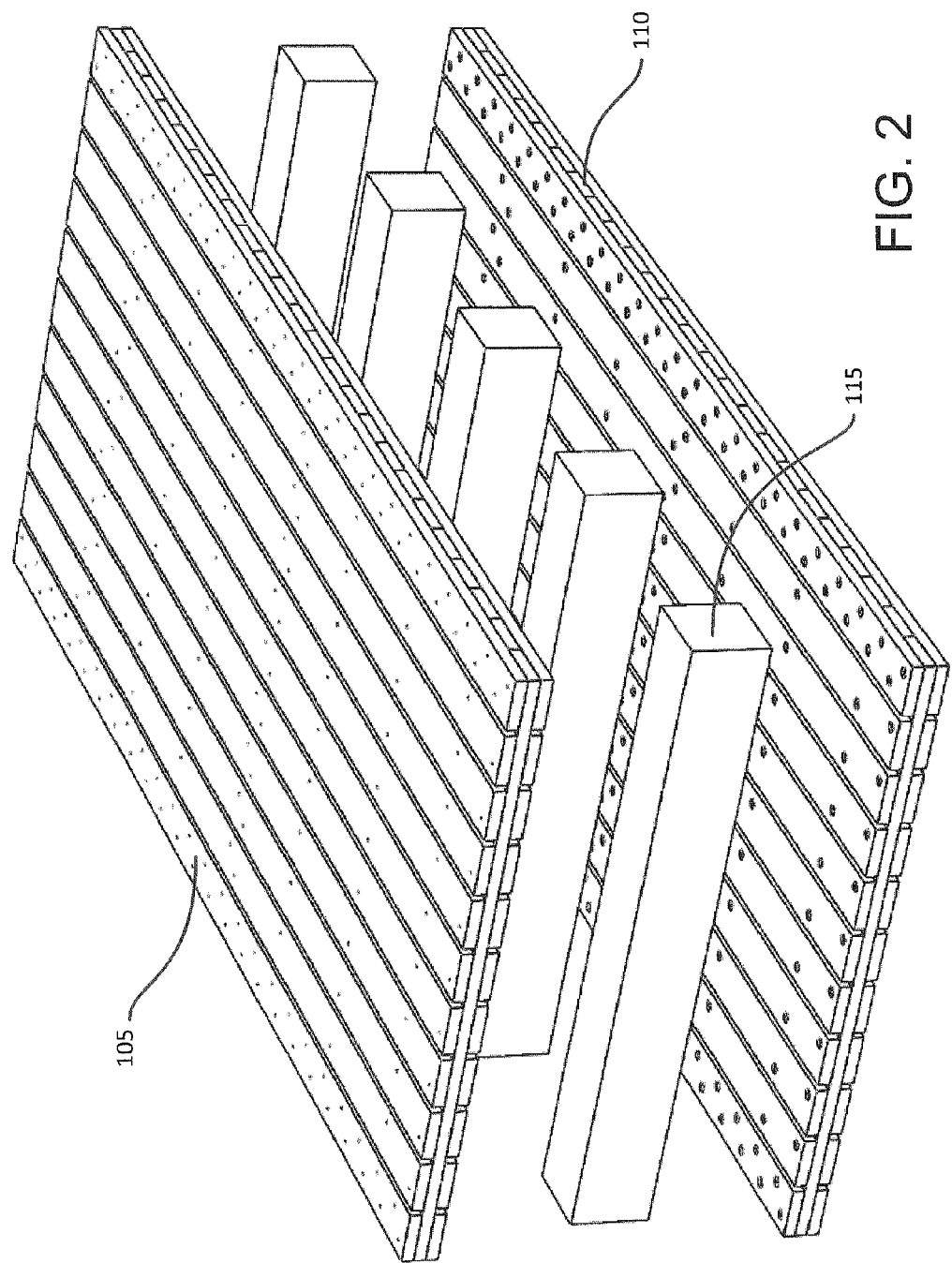
FIG. 2 is an exploded view illustrating the stackable mat assembly of FIG. 1 according to certain embodiments of the disclosure.

FIG. 2 is an exploded view illustrating the stackable mat assembly 100 of FIG. 1. In FIG. 2, the support spacers 115 of mat assembly 100 are spaced apart from each other creating a void 120 and extend in a transverse direction between mat 105 and mat 110. In other embodiments, support spacers 115 may extend in a longitudinal direction instead. Further, support spacers 115 may typically be about 12 inches by 12 inches in transverse thickness and about 8 feet to 16 feet long depending on their extended direction as discussed above. Support spacers 115 may be attached to each of mat 105 and mat 110 by a connector, such as bolts, screws, rivets or the like. In some embodiments, the connector may include a pass-through element, such as a metal sleeve or conduit to more easily and better align the connector through mat 105 or mat 110 into support spacer 115. For example, the connector may be configured to pass through from mat 105 to mat 110 via support spacers 115 and a metal sleeve disposed through mat 105, support spacers 115, and mat 110 for easier construction of mat assembly 100. When mat assembly 100 is configured as shown in FIGS. 1 and 2, in some embodiments, its combined depth or height Z may be about 2 to 4 feet in thickness. Support spacer 115 is configured to provide support and rigidity to mat assembly 100 via connecting mat 105 and mat 110 and to provide a unitary structure for mat assembly 100.

The support spacers can be made of any one of a number of materials. In one embodiment, the support spacers can be made of wood, either hardwoods or softwoods, or even of engineered wood or laminates thereof. The support spacers can be made of a single solid beam or column or of multiple layers or segments to provide the overall size needed. Of course, the segments or layers must be should be adhered or joined together so that they do not separate or move when the stacker mat is in use. This can also be achieved by the way the layers are bolted together when joining the first and second mats together. At least two bolts passing through the first and second mats and the multiple layers or components of the support spacers would be necessary to prevent such movement.

The invention also contemplates the use of plastic beams or structures for the support spacers. The plastic beams can be made of a structure, such as HDPE blocks or sheets or as a solid or hollow pultruded fiber reinforced thermosetting plastic tube. Sheets or boards of thermoplastic material can be used which are placed or layered upon each other to achieve the desired thickness for spacing the first and second mats away from each other. The thermoplastic layers would typically be use for lighter weight mats. When heavier constructions are required, the pultruded tubes can be filled with other materials to give the stacker mat greater strength and weight and also to reduce its tendency to be buoyant when placed in water. The support spacers can also be made out of any one of a number of metals, in particular for forming a truss member arrangement for joining the first and second mats together. This is explained further below with regard to the description of other figures.

The number of support spacers can vary from between 2 and 8 depending upon the length of the mat but preferably is between 3 to 6. The number of spacers also depends upon the thickness or strength of each spacer with larger structures generally requiring a lesser number that thinner spacers. A skilled artisan can select the best number and arrangement of spacers for any particular overall mat size. Also, the support spacers can be made as a single beam or structure or as an elongated member that has multiple layers that are joined together by adhesives, bolting, welding or other mechanical means in order to provide the desired spacing of the first and second industrial mats. For example, when the mats are spaced by 18 inches, and when pine timbers are used as the elongated members, a single 18 inch by 18 inch beam, two 9 inch by 18 inch beams or three 6 inch by 18 inch beams can be used. The length of these beams would generally be the full length of the mat although it is not necessary for these beams to provide continuous support of the mats. It is contemplated that shorter lengths can also be used provided that enough of the width of the mats is supported and that the beams are each sufficiently bolted to the first and second industrial mats in at least two spaced locations so that the beams do not move laterally when the mats are being moved or transported.

Figure 3:
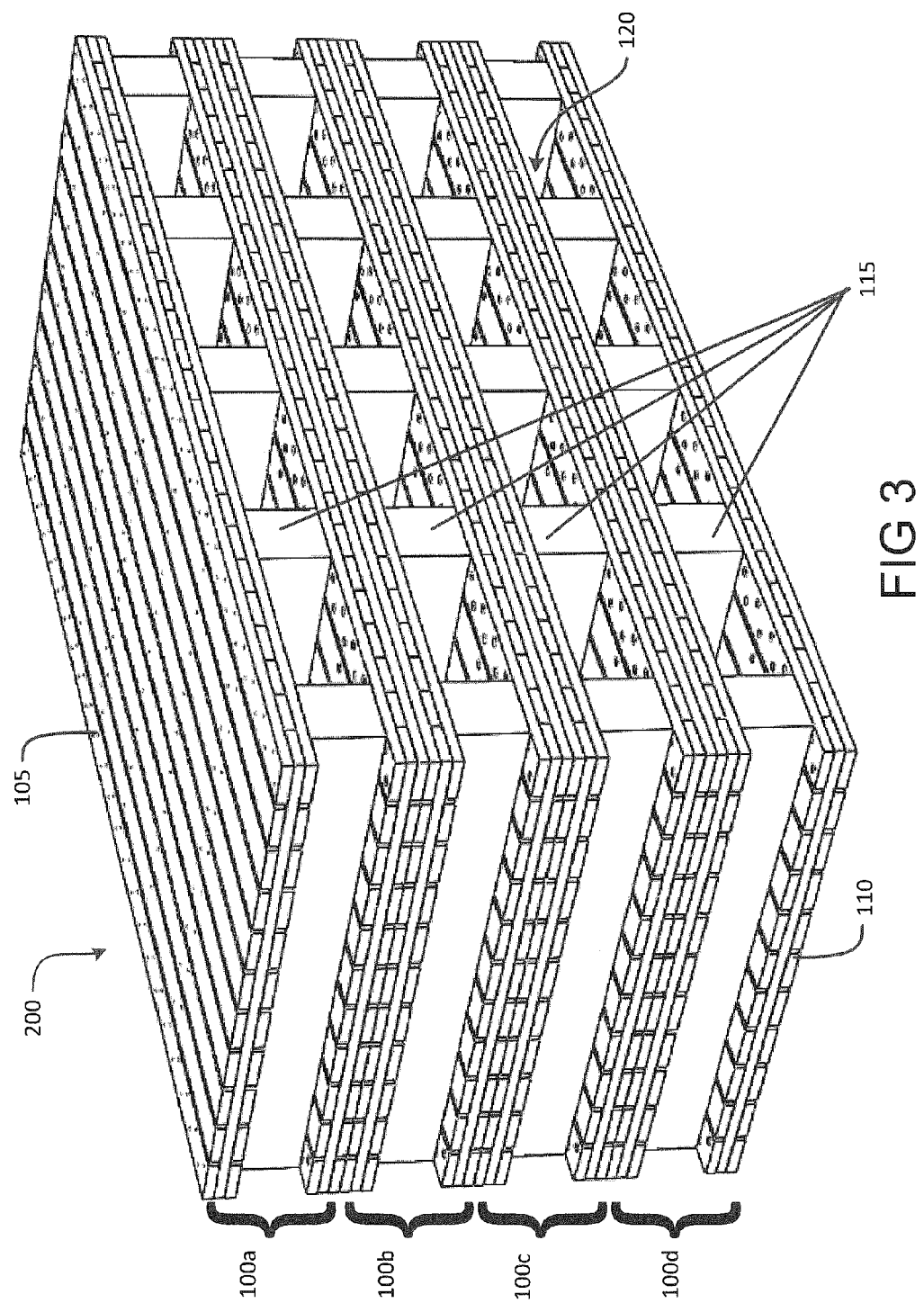
FIG. 3 is a perspective illustrating a stack of the stackable mat assembly of FIG. 1 according to certain embodiments of the disclosure.

FIG. 3 is a perspective illustrating a stack 200 of the stackable mat assembly 100 of FIG. 1. In FIG. 3, stack 200 may include a plurality of stackable mat assemblies 100a, 100b, 100c and 100d placed one upon another until a desired or needed depth is achieved based on the depth of the water or swampy area in which mat assembly 100 may be deployed by a user. For example, stack 200 includes four stackable mat assemblies stacked on top of one another at 100a, 100b, 100c, and 100d with each mat assembly 100 including a plurality of support spacers 115. These support spacers 115 create large voids 120 to allow for water flow-through, provide strength and stability to mat assembly 100 and cause mat assembly 100 to be lighter than simply directly stacking mat 105 and mat 110 on top of each other into a sized stack similar in depth to stack 200. Voids 120 may vary in dimension depending on load requirements of mat assembly 100. In other words, the more or larger support spacers 115 that are needed due to load requirements placed on mat assembly 100, may lead to smaller or tighter voids 120.

Further, between each of 100a, 100b, 100c, and 100d may be included another connector to maintain and stabilize stack 200 during use. In other words, the connector may be configured to hold each mat assembly 100 in place when stacked to prevent any shifting or the like. In some embodiments, mat 105 may include an alignment groove or catch disposed on its upper or exterior surface as this connector when stacked to prevent any shifting or movement relative to other mat assemblies 100a, 100b, 100c and 100d in the stack 200.

In some embodiments, support spacers 115 may comprise beams of timber, weighted composite material, or the like. In certain embodiments, support spacers 115 may be dimensioned to be about 8 to 24 inches by 8 to 24 inches in a width or transverse cross-section, preferably 12 by 12 inches, and a length or longitudinal dimension to closely match that of either the X or the Y dimensions of mat 105 and mat 110, accordingly. As noted herein, the spacers can be made of a single material or can be configured in multiple layers that are mechanically joined together to provide the desired size.

Any number of support spacers can be used depending upon the size and performance requirements expected for the first and second industrial mats. Although five beams are shown in FIGS. 1-3, any number between 2 and 12 can be used. The number of beams will determine what size is needed, as the more beams that are used the smaller their overall dimensions can be. And as noted, the beams do not need to fully span the width of the mats in every embodiment. All that is needed is sufficient support of the first and second mats so that vehicle or personnel movement over the mats can be achieved without collapsing the mats into spaces between them.

In certain embodiments, mat 105 and mat 110 may be configured with a modulus of elasticity of at least 1.6 Mpsi, and each industrial mat 105, 110 may be configured with a load bearing capacity that is configured to withstand a load of at least 500 to 1000 psi without permanent deformation of the first and second industrial mats.

Preferably, in certain embodiments, lift elements 125a, 125b may be included and disposed through voids 120 and around mat 105 of mat assembly 100 in order to provide a means of easily and readily maneuvering and lifting mat assembly 100 into position in a water or swampy area as needed to create a roadway or platform about water levels. In other embodiments, lift elements 125a, 125b may be disposed to wrap around or encircle mat assembly 100 about mat 105 and mat 110 in a transverse or Y direction. In some embodiments, lift elements 125a, 125b may include D-shaped rings, O-shaped rings, chains or cables connected directly to the first industrial mat to allow overhead lifting of the stacker mat. The D-shaped rings, O-shaped rings, chains or cables may be optionally coated or painted to provide additional environmental resistance to the support structure of the mat assembly 100. Lift elements 125a, 125b may be attached to mat assembly 100 at a plurality of locations. It should be noted that the lift elements are not limited to the two elements shown in FIG. 1 at 125a, 125b. There may be a plurality of lift elements 125a, 125b beyond two based on the size of mat assembly.

The lift elements would be securely attached to either the first or second industrial mats, or even through the internal support spacers and one or both of those mats. When the support spacers are metal, the lifting elements can be mounted on a rod that is welder to a support spacer. Alternatively, the lift elements can be mounted on a plate that is bolted to the first or second mats or to a metal rod or bolting member that extends through the entire stacker mat. And to facilitate movement of personnel or vehicles over the first or second mats, the lift elements can be provided in a recessed area in the outermost layer of the first or second mats so that they can lay flat when not being used to lift, move or transport the stacker mat. Two or four lift elements can be provided on each of the first and second mats so that either one of these mats can form the top of the structure when it is installed.

Figure 4:
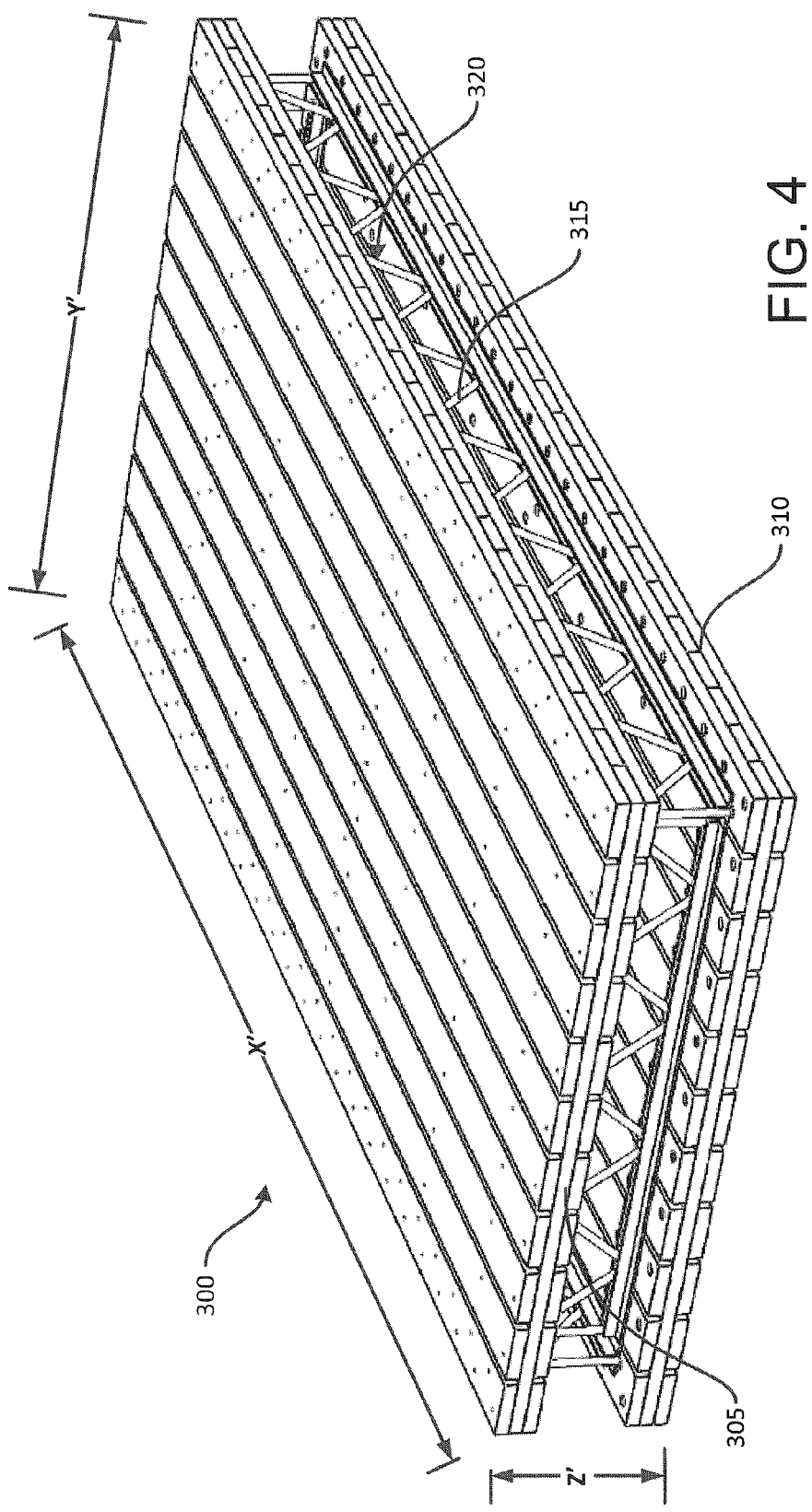
FIG. 4 is a perspective view of a stackable mat assembly according to an alternative embodiment of the disclosure.

An alternative embodiment of the present inventive apparatus is illustrated in FIG. 4. FIG. 4 is a perspective view of a stackable mat assembly 300. In FIG. 4, mat assembly 300 may include a first industrial mat 305 forming an upper portion, a second industrial mat 310 forming a lower portion, and an internal truss support 315 comprising a number of truss members. First industrial mat 305 may comprise a plurality of layers or plies of construction material. Second industrial mat 310 may comprise a plurality of layers or plies of construction material. The construction material may include metal, an elastomeric material, a thermoplastic material, a thermosetting material, or a combination thereof.

Truss support 315 is also configured to include a plurality of voids 320. Voids 320 provide the benefit of forming a flow-through passage for water to easily flow when mat assembly 300 is submerged in water or swampy areas. Mat assembly 300 may be configured to include a longitudinal dimension X', a transverse dimension Y', and a depth or height dimension Z'. In some embodiments, dimension X' is about 16 feet, dimension Y' is about 8 feet and dimension Z' is about 2 to 4 feet.

Figure 5:
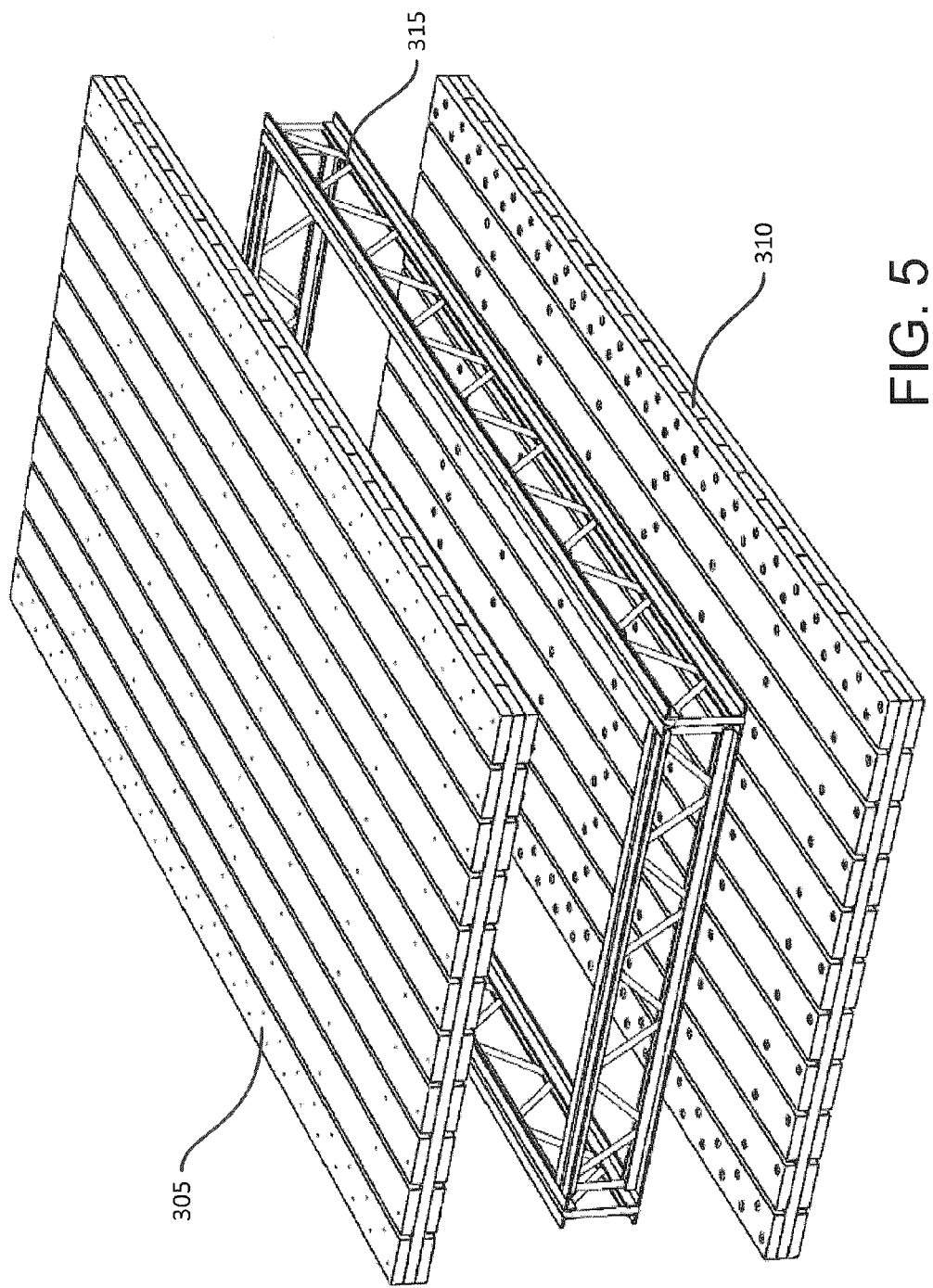
FIG. 5 is an exploded view illustrating the stackable mat assembly of FIG. 4 according to certain embodiments of the disclosure.

FIG. 5 is an exploded view illustrating the stackable mat assembly 300 of FIG. 4. In FIG. 5, truss support 315 may be configured to support and separate mat 305 and mat 310. Support 315 may be configured, in some embodiments, as a perimeter mounted truss as shown in FIG. 5. In other embodiments, support 315 may be configured as a perimeter mounted truss and a truss extending longitudinal and/or extending transverse disposed truss structures. In some embodiments, truss support 315 may include a truss spacer disposed in the middle or centered area of mat assembly 300 extending either longitudinally or transversely for support and strengthening of mat 305 and mat 310. In certain embodiments, support 315 may be configured in an X-pattern to provide strength and support to mat 300. Truss support 315 may comprise of aluminum, copper, steel, such as stainless steel, galvanized steel, or the like. In some embodiments, truss support 315 may comprise a plastic such as those described above with respect to support spacer 115. Truss support 315 is configured to provide support and rigidity to mat assembly 300 via connecting mat 305 and mat 310 and to provide a unitary structure for mat assembly 300. Support 315 may be configured to be connected to mat 305 and mat 310 in a similar manner as described above for support 115 via bolts, rivets, screws or the like.

Mat assembly 300 may be stacked in a similar manner as described above regarding 100 when submerged and stacked to a level above the water level in a swampy area or water to provide a work platform and/or roadway. Similarly, mat assembly 300 may be provided with a lifting element, similar to lifting element 125a, 125b discussed above and disposed about mat assembly 300 or within voids 320 to easily place and lift the mat assembly 300 as needed.

Although an example of the mat 300 is shown using a truss support 315, it will be appreciated that other supports can be used, such as a steel I-beam support disposed in a similar fashion as support spacers 115, discussed above. Also, although the mat assembly 300 is useful to provide a work platform or roadway over water or swampy areas, it can also be used to do other things and/or in other industries, such as to provide a mobile elevated work platform or mobile landing zone on dry land, especially in military applications.

Figure 6:
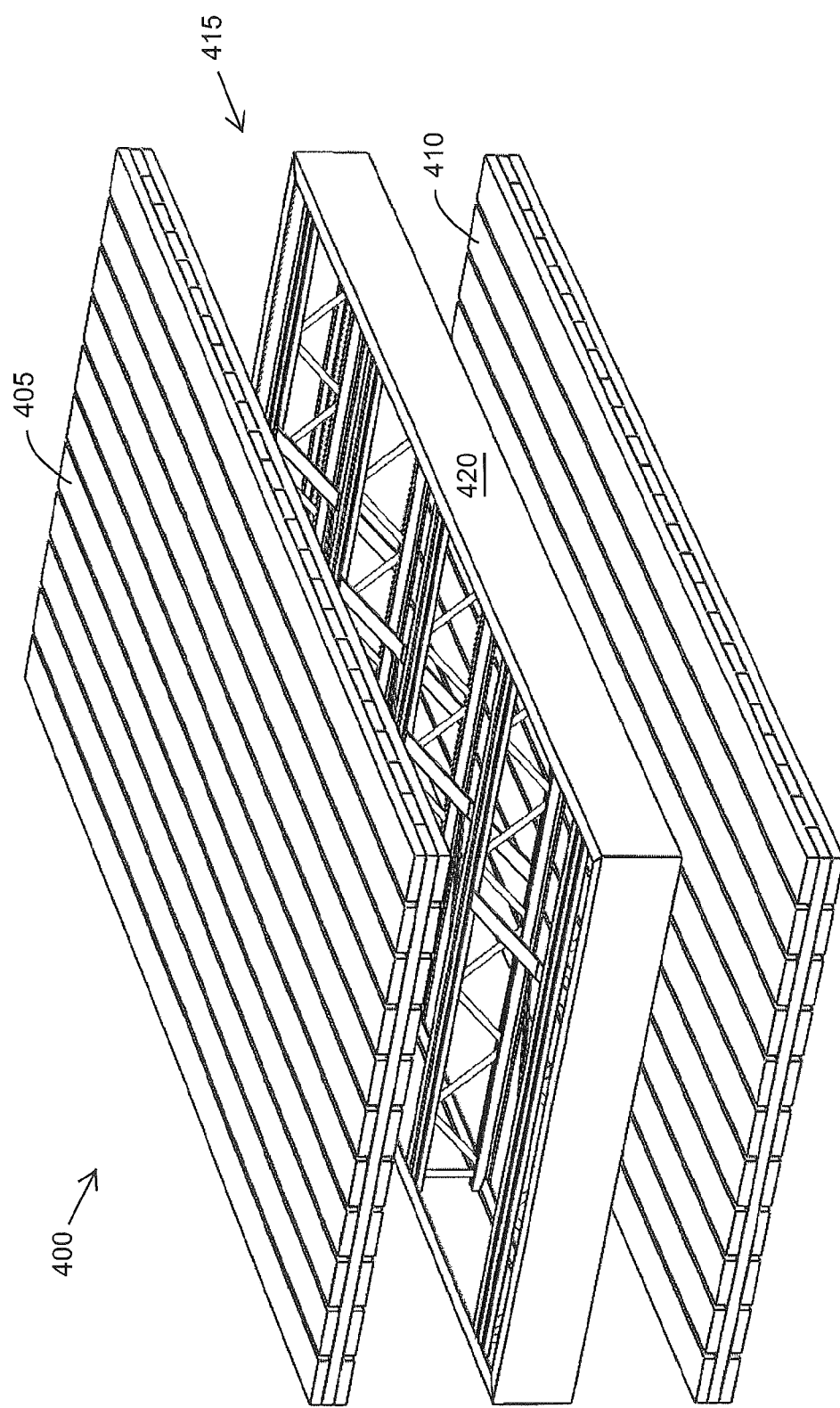
FIG. 6 is a perspective view of a stackable mat assembly according to another embodiment of the disclosure.
Figure 7:
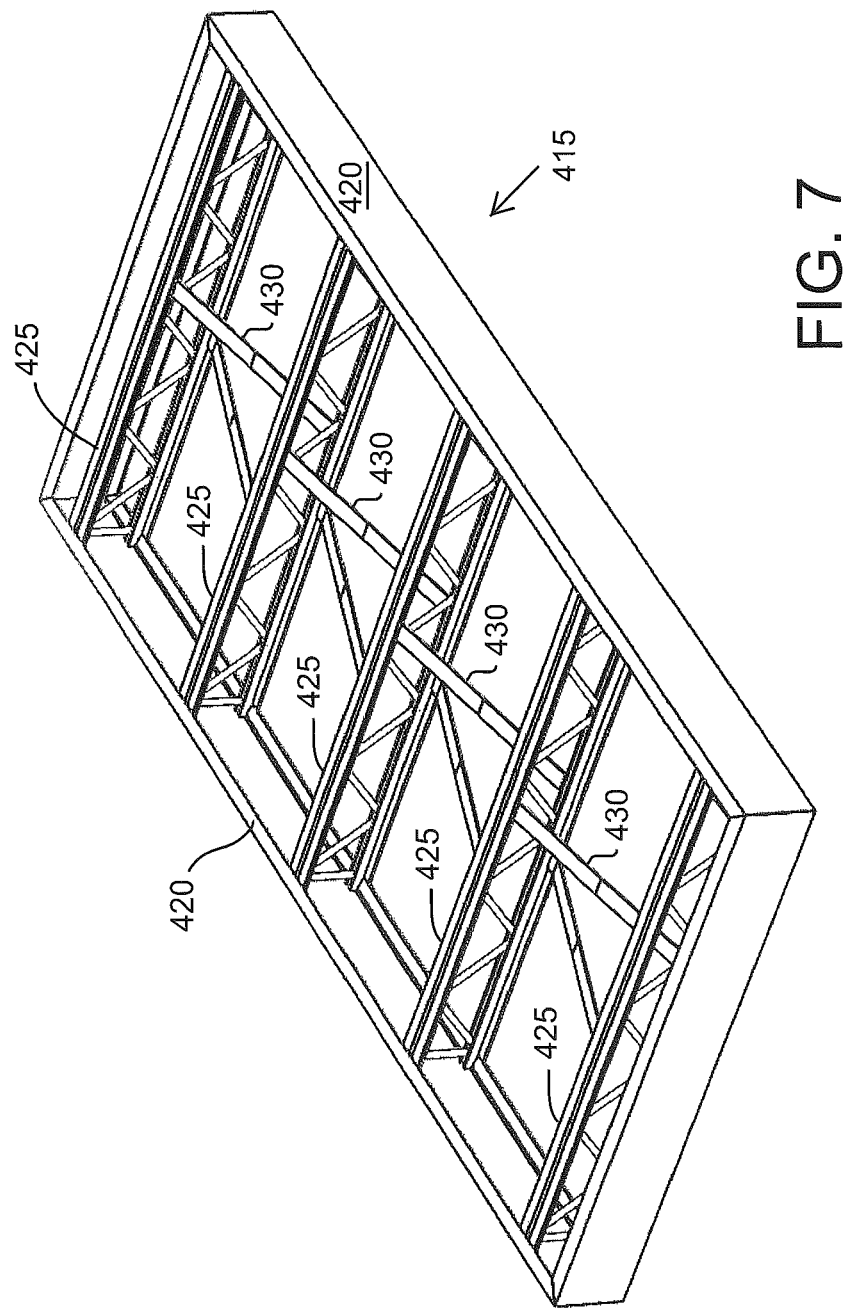
FIG. 7 is a perspective view of the internal support structure of the stackable mat of FIG. 6.
Figure 8:
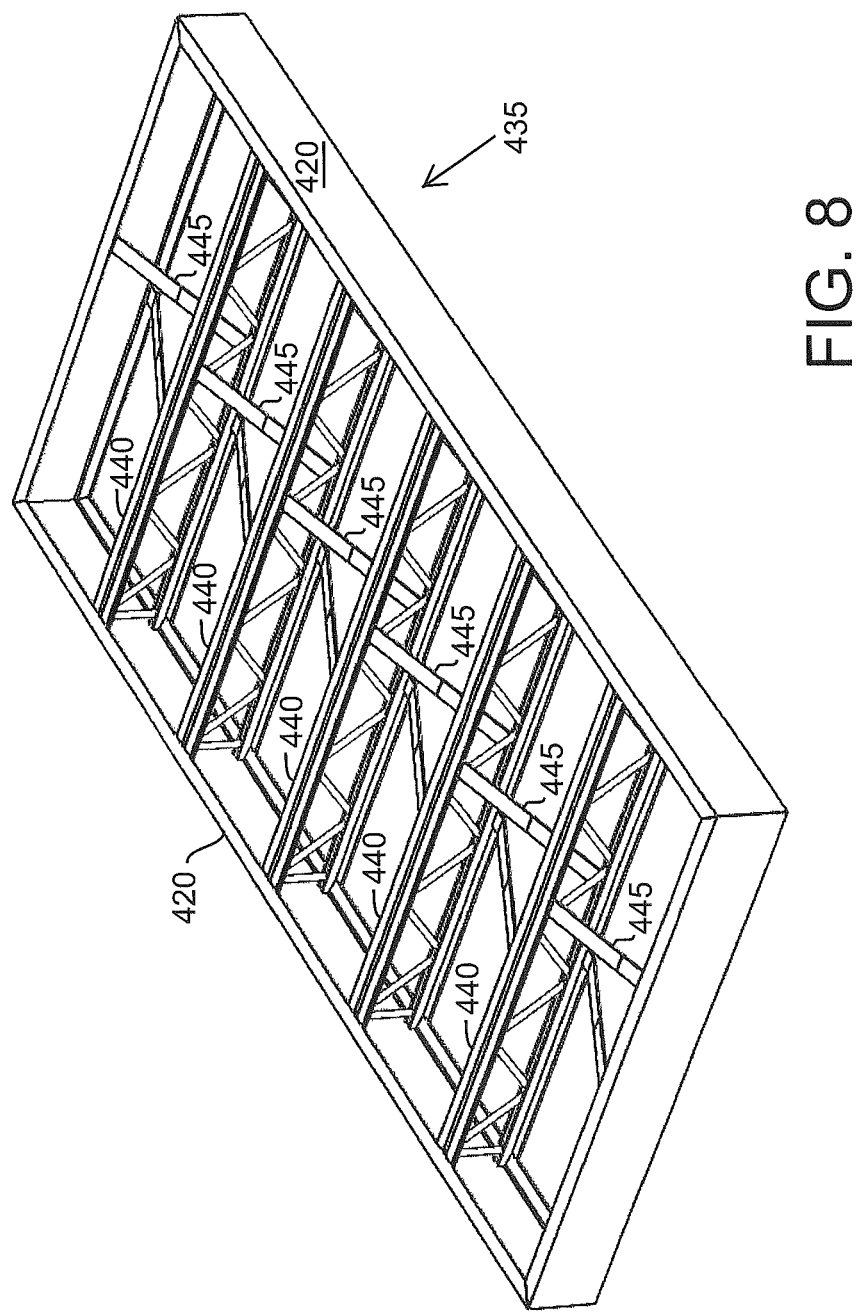
FIG. 8 is a perspective view of an alternative support structure for the stackable mat of FIG. 6.

FIGS. 6 to 8 illustrate another embodiment of the present inventive apparatus. FIG. 6 is a perspective view of another mat assembly 400 that includes a first industrial mat 405 forming an upper portion of the structure, a second industrial mat 410 forming a lower portion of the structure, and an internal truss support 415 that joins the upper and lower portions together. This truss support is more clearly shown in FIG. 7 wherein it includes a peripheral frame 420 which attaches to the perimeter of the upper 405 and lower 410 portions. The rectangular frame is formed of four C-shaped beams which are welded together where they meet at the corners. The frame 420 surrounds 5 truss members 425 which span the width of the mat within the frame between the upper and lower portions.

The truss members 415 are made of steel having upper and lower plates that are attached by angled support members as shown. In addition, the truss members are further supported by steel cross-members 430 to provide further strengthening of the internal support structure that holds the upper and lower portions together in the stackable mat 400.

As in the embodiment of FIGS. 4 and 5, both the first industrial mat 405 and the second industrial mat 410 include a plurality of layers or plies of construction material that may be made of a metal, an elastomeric material, a thermoplastic material, a thermosetting material, or a combination thereof.

The use of the frame 420 that surrounds the truss members 415 can help prevent the egress of mud or other debris into the core of the mat 400 when it is fully or partially submerged in a water environment. Additionally, it is possible to form the frame of rectangular plates or of I-beams with similar results. When rectangular plates are used, additional connectors such as L-shaped links are used to join the plates to the upper and lower portions, preferably by bolting. The links can be welded to the plates if desired to facilitate assembly of the structure 415. When I-beams are used, the corners may need some removal of the interfering flanges in order to provide a welded joint in the corners of the frame 420. And of course the flanges of the I-shape or C-shape frame would be bolted to the industrial mats of the upper and lower portions to form a secure structure. The upper surfaces of the truss members 415 are secured to the upper and lower portions in the same manner.

The mats of FIGS. 4 to 8 can be provided with different lifting elements that are attached to the steel members of the trusses or frame. If the frame is open as shown in FIGS. 4 and 5, the lifting elements can be attached directly to them. For the embodiments of FIGS. 6-8, a hole can be made in the mats to provide address to the steel frame of truss members to which the lifting elements can be attached by welding or bolting. A number of lifting elements can be provided to facilitate movement, placement or retrieval of the mats. A number of preferred lifting elements are shown in application No. 62/211,664 filed Aug. 28, 2015, the entire content of which is expressly incorporated herein by reference thereto.

FIG. 8 illustrates a variation of the truss members 415 of FIG. 7. In FIG. 8, truss member 435 includes the same frame structure 420 of C-shaped steel beams, but in this embodiment the lateral truss members 440 are spaced equidistantly across the interior of the structure. It is also possible to use more or less truss members 415 or 440 depending upon the desired joining strength needed to securely hold the upper and lower portions together. While 5 truss members are shown, any number can be used deposing upon the results desired. Typically, between 2 and 10 truss members are used. Also, the truss members 440 include cross-members 445 for further strengthening of the internal support structure. And as additional truss members are provided, the internal support can be used with thicker or larger industrial mats that are used for the upper and lower portions. The foregoing embodiments illustrate the versatility of the present invention where in a wide range of stackable mats of different configurations can be provided.

Figure 9:
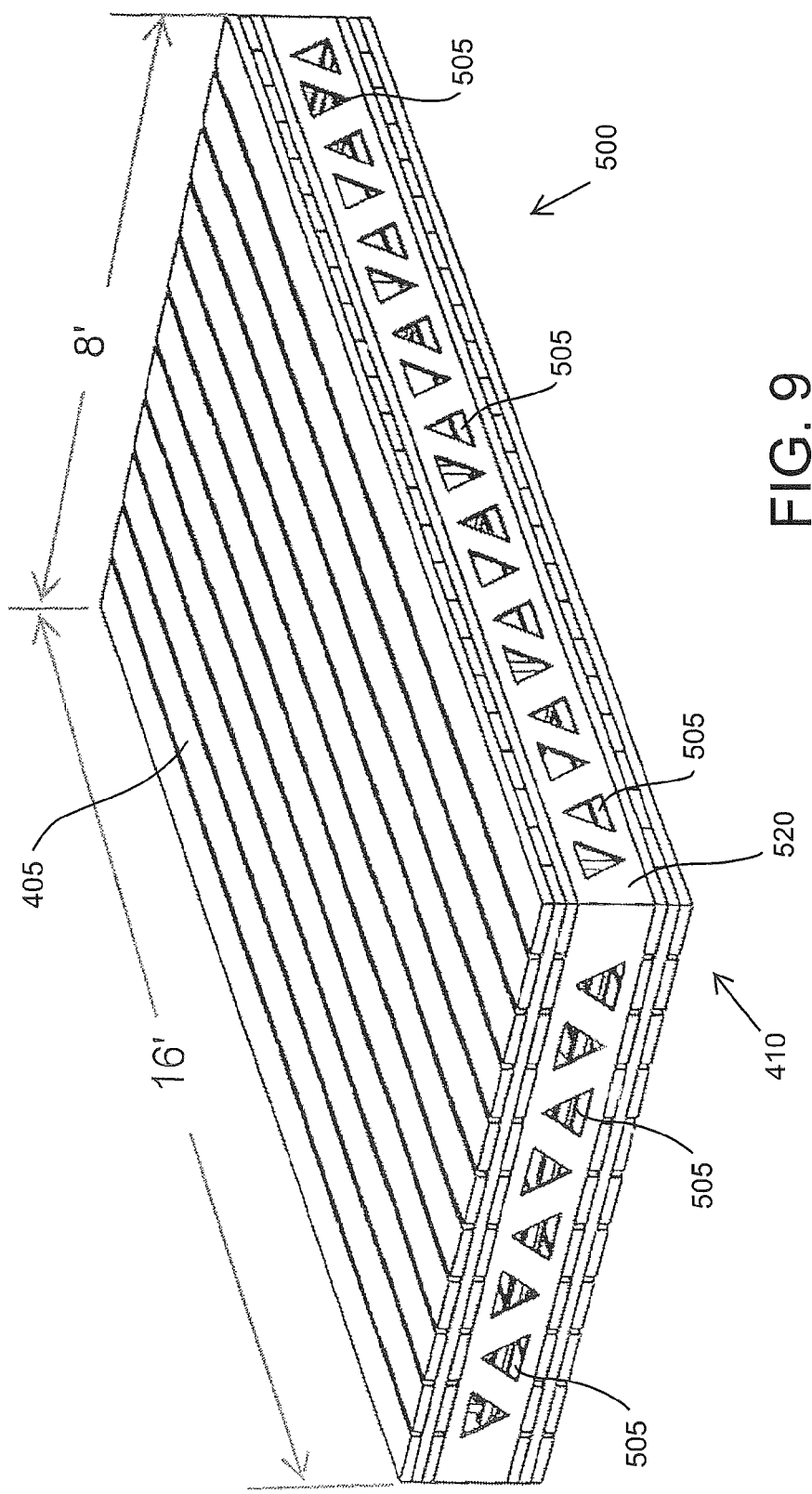
FIG. 9 is a perspective view illustrating another stackable mat assembly according to the invention.
Figure 10:
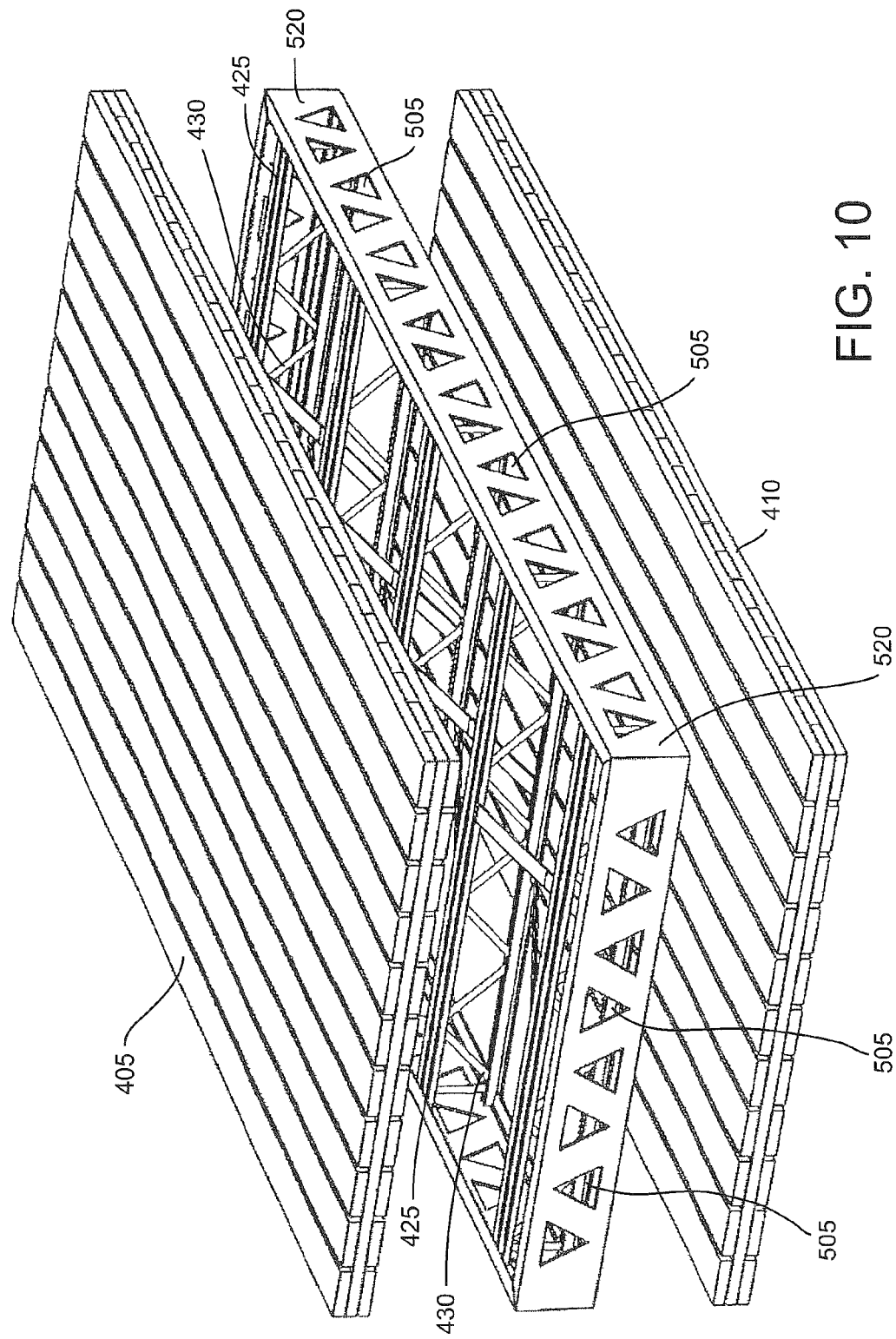
FIG. 10 is an exploded view illustrating the stackable mat assembly of FIG. 9.

FIGS. 9-10 illustrate another embodiment of the invention. The stacker mat 500 shown in these figures is similar to the one shown in FIGS. 6-8 with the same element numbering utilized for components that are the same as in those previous figures. The internal truss arrangements for the mats of FIGS. 9-10 would be the same as that for FIGS. 6-8. As noted any particular number or spaced arrangement of truss members can be used depending upon the performance requirements of the stacker mat 500.

The main difference for stacker mat 500 is that the peripheral frame 520 that joins the first 405 and second 410 mats together is provided with a series of openings 505 that allow any water that enters into the internal area of the stacker mat 500 to also exit once the mat is retrieved. The peripheral frame 520 also prevents larger debris from entering into the space between the first and second mats, but the holes 505 are of sufficient size to first allow water to enter into the mat so that it can be properly placed in a stream or wet environment. And after use of the stacker mat 500 is completed, the holes 505 allow the water to drain from the mat as it is lifted and retrieved for transport to the next job site.

Regarding the treatment of the mat and spacer components to provide environmental and water resistance, this would depend on the type of material that is used for those components. For example, wood can be treated by soaking in a hydrocarbon (e.g., kerosene, tung oil, linseed oil or other oils), by pressure treatment or by coating with creosote paints or other coating materials. Steels can be painted or coated or galvanized, while aluminum can be anodized. Plastics and elastomers are generally water resistant and do not require additional treatment.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the present invention.

What is claimed is:

1. A stacker mat comprising:
a first industrial mat having a plurality of layers or plies of construction materials for forming the upper portion of the stacker mat, the first industrial mat made of materials and having a thickness that provide support for vehicle movement thereover;
a second industrial mat having a plurality of layers or plies of construction materials for forming the lower portion of the stacker mat, the second industrial mat also made of materials and having a thickness that provide support for vehicle movement thereover;
an internal support structure that includes a plurality of truss or elongated members for retaining the first and second mats in parallel spaced relation at a distance that is greater than the thickness of the first industrial mat, the second industrial mat or of both the first and second industrial mats; and
a frame that includes plates, beams or an open truss structure, with the frame surrounding the internal support structure and connected to the first and second industrial mats at or near their peripheries.

2. The stacker mat of claim 1, wherein at least a portion of the plates or beams of the frame include openings or the open truss structure is present, and wherein the truss or elongated members of the internal support structure are spaced to allow water to flow between the first and second industrial mats so that the stacker mat may be placed in wet areas to form a temporary roadway or platform.

3. The stacker mat of claim 1, wherein the internal support structure includes elongated members comprising beams, columns, structures or layers of wood, engineered wood, thermoplastics, thermosetting plastics, elastomers, recycled plastic materials, steel, aluminum, stainless steel, copper or other metals, weighted composite material or any combination thereof.

4. The stacker mat of claim 1, wherein the internal support structure includes metal truss members made of steel, stainless steel, aluminum, copper, galvanized steel or a combination thereof.

5. The stacker mat of claim 4, wherein the truss members are connected by cross-members for additional strength in holding the first and second industrial mats in their parallel spaced relation.

6. A stacker mat comprising:
a first industrial mat having a plurality of layers or plies of construction materials for forming the upper portion of the stacker mat, the first industrial mat made of materials and having a thickness that provide support for vehicle movement thereover;

a second industrial mat having a plurality of layers or plies of construction materials for forming the lower portion of the stacker mat, the second industrial mat also made of materials and having a thickness that provide support for vehicle movement thereover;

an internal support structure that includes a plurality of truss or elongated members for retaining the first and second mats in parallel spaced relation at a distance that is greater than the thickness of the first industrial mat, the second industrial mat or of both the first and second industrial mats, wherein the internal support structure includes metal truss members made of steel, stainless steel, aluminum, copper, galvanized steel or a combination thereof; and a frame that includes plates or beams that surround the truss members with the frame connected to the first and second industrial mats at or near their peripheries.

7. The stacker mat of claim 6, wherein the frame comprises plates having sufficient openings to allow water to flow between the first and second industrial mats so that the stacker mat may be placed in wet areas to form a temporary roadway or platform.

8. The stacker mat of claim 1, wherein first industrial mat, the second industrial mat or both of the first and second industrial mats comprises wood, engineered wood, a thermoplastic, a reinforced thermosetting plastic, an elastomer, solid, hollow or filled tubular components, encapsulated material, a composite material, or a combination thereof, any or all of which are optionally configured or treated to have water and environmental resistance.

9. The stacker mat of claim 1, further comprising lifting elements including D-shaped rings, O-shaped rings, chains or cables that are connected directly to the stacker mat to allow overhead lifting of the stacker mat, wherein the lifting elements are optionally coated, painted or treated to provide additional water and environmental resistance.

10. The stacker mat of claim 1, wherein the plurality of layers or plies of the first industrial mat and the second industrial mat comprises two or three layers or plies for each industrial mat.

11. The stacker mat of claim 10, wherein the first industrial mat and the second industrial mat each include two layers or plies, wherein the layers or plies are each about three inches in thickness with a modulus of elasticity of at least 1.6 Mpsi, and wherein each industrial mat has a load bearing capacity that is configured to withstand a load of at least 500 to 1000 psi without permanent deformation of the first and second industrial mats.

12. A stacker mat, comprising:
a first industrial mat having a plurality of layers or plies of construction materials for forming the upper portion of the stacker mat, the first industrial mat made of materials and having a thickness that provide support for vehicle movement thereover;

a second industrial mat having a plurality of layers or plies of construction materials for forming the lower portion of the stacker mat, the second industrial mat also made of materials and having a thickness that provide support for vehicle movement thereover; and an internal support structure that includes a plurality of truss or elongated members for retaining the first and second mats in parallel spaced relation at a distance that is greater than the thickness of the first industrial mat, the second industrial mat or of both the first and second industrial mats, wherein the internal support structure includes metal truss members made of steel, stainless steel, aluminum, copper, galvanized steel or a combination thereof;

wherein the first industrial mat and the second industrial mat each include three layers or plies, wherein the layers or plies are each about two inches in thickness with a modulus of elasticity of at least about 1.6 Mpsi, and wherein each industrial mat has a load bearing capacity that is configured to withstand a load of at least about 500 to about 1000 psi without permanent deformation of the first and second industrial mats.

13. The stacker mat of claim 1, wherein the first industrial mat and the second industrial mat are configured to include an overall thickness of about 6 to about 8 inches, a longitudinal dimension of about 6 to about 40 feet, and a transverse dimension of about 6 to about 10 feet.

14. The stacker mat of claim 1, wherein the first and second mats are retained in parallel spaced relation at a distance of about 1 to about 3 feet.

15. The stacker mat of claim 1, the internal support structure is attached to the first industrial mat and the second industrial mat via bolts, screws or rivets and wherein the truss or elongated members have a modulus of elasticity of at least about 1.6 Mpsi, and wherein the truss or elongated members have a load bearing capacity that is configured to withstand a load of at least about 500 to about 1000 psi without permanent deformation of the truss or elongated members.

16. The stacker mat of claim 1, wherein the internal support structure is made of environmentally resistant materials to avoid deterioration of the internal support structure when repeatedly exposed to water.

17. A stacker mat comprising:
a first industrial mat having a plurality of layers or plies of construction materials for forming the upper portion of the stacker mat, the first industrial mat made of materials and having a thickness that provide support for vehicle movement thereover;

a second industrial mat having a plurality of layers or plies of construction materials for forming the lower portion of the stacker mat, the second industrial mat also made of materials and having a thickness that provide support for vehicle movement thereover; and an internal support structure for retaining the first and second mats in parallel spaced relation at a distance that is greater than the thickness of the first industrial mat, the second industrial mat or of both the first and second industrial mats;

wherein the first industrial mat and the second industrial mat each include three layers or plies having a modulus of elasticity of at least about 1.6 Mpsi with each layer or ply comprising wood, engineered wood, a thermoplastic, a reinforced thermosetting plastic, a metal, an elastomer, solid, hollow or filled tubular components, encapsulated material, a composite material, or a combination thereof, any or all of which are optionally configured or treated to have water and environmental resistance, wherein each industrial mat has a load bearing capacity that is configured to withstand a load of at least about 500 to about 1000 psi without permanent deformation of the first and second industrial mats.

18. The stacker mat of claim 17, wherein the internal support structure includes elongated members comprising beams, columns, structures or layers of wood, engineered wood, thermoplastics, thermosetting plastics, elastomers, recycled plastic materials, steel, aluminum, stainless steel, copper or other metals, weighted composite material or any combination thereof.

19. The stacker mat of claim 18, wherein the internal support structure has sufficient openings to allow water to flow between the first and second industrial mats so that the stacker mat may be placed in wet areas to form a temporary roadway or platform.

20. The stacker mat of claim 17, wherein the support structure comprises support spacers make of beams or columns or multiple layers of wood, plastic, elastomer or metal materials.

* * * * *